(12) United States Patent
Martin et al.

(10) Patent No.: US 9,296,388 B2
(45) Date of Patent: Mar. 29, 2016

(54) METHOD AND SYSTEM FOR ENGINE CONTROL (71) Applicant: Ford Global Technologies, LLC, Dearborn, MI (US)

(72) Inventors: Douglas Raymond Martin, Canton, MI (US); Ted Haladyna, Northville, MI (US); Kenneth James Miller, Canton, MI (US); Scott James Thompson, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/664,237

(22) Filed: Mar. 20, 2015

(65) Prior Publication Data

US 2015/0197241 A1 Jul. 16, 2015

Related U.S. Application Data

(63) Continuation of application No. 13/849,417, filed on Mar. 22, 2013, now Pat. No. 8,989,935.

(51) Int. Cl.
| | |
|---|---|
| *B60L 9/00* | (2006.01) |
| *F02M 1/02* | (2006.01) |
| *B60W 10/00* | (2006.01) |
| *B60W 20/00* | (2006.01) |
| *F02D 29/02* | (2006.01) |
| *F02D 41/02* | (2006.01) |
| *F02N 11/08* | (2006.01) |

(52) U.S. Cl.
CPC ........... *B60W 20/1082* (2013.01); *B60W 20/00* (2013.01); *F02D 29/02* (2013.01); *F02D 41/024* (2013.01); *F02N 11/0829* (2013.01); *F02N 11/0818* (2013.01); *F02N 2200/026* (2013.01); *F02N 2200/061* (2013.01); *Y02T 10/26* (2013.01); *Y02T 10/48* (2013.01); *Y10S 903/903* (2013.01); *Y10T 477/677* (2015.01)

(58) Field of Classification Search
USPC .......................... 701/22; 123/395; 180/65.265
See application file for complete search history.

(56) References Cited

U.S. PATENT DOCUMENTS

| | | | |
|---|---|---|---|
| 6,427,793 B1 | 8/2002 | Hanada et al. | |
| 7,958,957 B2 | 6/2011 | Suzuki et al. | |
| 8,246,512 B2 | 8/2012 | Tabata et al. | |
| 2002/0017269 A1 | 2/2002 | zur Loye et al. | |
| 2004/0238243 A1 | 12/2004 | King et al. | |
| 2005/0204727 A1 | 9/2005 | Lewis et al. | |
| 2007/0074702 A1 | 4/2007 | Nakamura et al. | |
| 2007/0209618 A1* | 9/2007 | Leone ...................... | B60K 6/24 123/90.12 |
| 2007/0295290 A1* | 12/2007 | Cao ........................ | F02B 75/021 123/64 |
| 2008/0047509 A1 | 2/2008 | Sellnau et al. | |
| 2009/0062070 A1 | 3/2009 | Tabata et al. | |
| 2010/0038158 A1* | 2/2010 | Whitney ................. | B60K 6/365 180/65.265 |
| 2010/0057330 A1 | 3/2010 | Whitney et al. | |

(Continued)

*Primary Examiner* — Thomas G Black
*Assistant Examiner* — Tyler Paige
(74) *Attorney, Agent, or Firm* — David Kelley; Alleman Hall McCoy Russell & Tuttle LLP (57) ABSTRACT

Methods and systems are provided for extending an engine-off period of a hybrid vehicle while reducing engine cold-start emissions. During an engine pull-up to meet operator demand, the engine is held at a higher power for a longer duration to aggressively heat the exhaust catalyst. Subsequently, the engine is pulled up to a lower power and held at the lower power for shorter bursts of time to activate the exhaust catalyst.

19 Claims, 4 Drawing Sheets

(56) References Cited

U.S. PATENT DOCUMENTS

| | | | |
|---|---|---|---|
| 2010/0063658 A1* | 3/2010 | Martin | B60K 6/365 701/22 |
| 2010/0108032 A1* | 5/2010 | Pursifull | B60W 10/06 123/406.12 |
| 2011/0132285 A1 | 6/2011 | Pursifull | |
| 2011/0139117 A1* | 6/2011 | Kar | F02D 11/105 123/395 |
| 2011/0166732 A1 | 7/2011 | Yu et al. | |
| 2011/0270511 A1 | 11/2011 | Kurtz | |
| 2012/0191324 A1 | 7/2012 | Surnilla et al. | |
| 2012/0225752 A1 | 9/2012 | Gonze et al. | |
| 2013/0008418 A1 | 1/2013 | Kurtz | |
| 2013/0218441 A1* | 8/2013 | Thomas | F02D 41/065 701/105 |
| 2013/0268182 A1 | 10/2013 | Treharne et al. | |
| 2014/0288736 A1* | 9/2014 | Martin | F02D 29/02 701/22 |

* cited by examiner

METHOD AND SYSTEM FOR ENGINE CONTROL

CROSS REFERENCE TO RELATED APPLICATIONS

The present application is a continuation of U.S. patent application Ser. No. 13/849,417, entitles "METHOD AND SYSTEM FOR ENGINE CONTROL," filed on Mar. 22, 2013, the entire contents of which are hereby incorporated by reference for all purposes.

FIELD

The present application relates to exhaust catalyst heating performed in vehicles, such as hybrid vehicles.

BACKGROUND AND SUMMARY

Hybrid electric vehicles (HEVs) and Plug-in HEVs (PHEVs) run primarily in an engine-off mode where the vehicle is propelled by an energy storage device (e.g., a battery) and/or an electric motor. The vehicle may be operated in an engine-on mode only during selected conditions. As a result, depending on the vehicle drive cycle and the battery charging cycle, the engine may be operated infrequently. While reduced engine operation times in hybrid vehicles enable fuel economy and reduced fuel emissions benefits, the shorter engine operation time also generates insufficient heat for keeping an exhaust catalyst activated. This, in turn, results in higher vehicle cold-start emissions.

One approach to address the cold-start emissions is illustrated by Hanada et al in U.S. Pat. No. 6,427,793. Therein, during vehicle operation, a hybrid vehicle is switched between different travel modes based on catalyst activation. Specifically, when the catalyst is activated, the vehicle is operated in a normal travel mode with engine operation based on torque demand. In comparison, when the catalyst is not activated, the engine is turned on irrespective of the operator torque demand to heat the catalyst.

The Inventors herein have recognized that the approach of Hanada et al may lead to frequent engine running which degrades the efficiency and core purpose of a hybrid vehicle. In particular, since engine operation with a cold catalyst degrades exhaust emissions, the engine is pulled-up frequently to keep the catalyst sufficiently hot, thus making it difficult to balance exhaust emissions and engine run-time in a hybrid vehicle. In addition, the vehicle operator's drive feel may be reduced due to the engine being pulled-up when the operator does not expect it to.

In view of these issues, the inventors herein have developed an approach to enable reduction in cold-start emissions as well as to reduce engine run time in a hybrid vehicle. In one embodiment, the method includes: within a single vehicle drive cycle, initially pulling up an engine to, and holding at, a higher power in response to operator torque demand, and subsequently pulling up the engine to, and holding at, a lower power in response to catalyst temperature. In this way, the engine-off duration can be extended.

In one example, a hybrid vehicle may be operated in an engine-off mode (or electric-only mode) until a driver torque demand exceeds the power that can be provided by a system battery and/or motor. To meet the increased power demand, the engine may be pulled-up to a higher power (e.g., a higher engine speed and a higher peak torque). The engine may then be maintained at the higher power for a duration, irrespective of the driver torque demand, in a first cold-start mode to opportunistically heat an exhaust catalyst during this initial engine cold-start. Once the catalyst is heated, the engine then be pulled down and the vehicle may resume operation in the engine-off mode.

While the vehicle is operating with the engine off, exhaust catalyst cooling may occur. For example, due to cold ambient conditions and/or the vehicle sitting still (e.g., in a parking lot, or in a tunnel), the exhaust temperature may fall to or near a (lower) temperature threshold, below which the catalyst's activity is degraded. In response to catalyst cooling, a subsequent engine cold-start operation may be performed. Specifically, the engine may be pulled-up again, however to a lower power (e.g., a lower engine speed and a lower peak torque) in a second cold-start mode. The engine may then be maintained in the lower power for a duration to sufficiently heat the exhaust catalyst. In addition, the threshold temperature at which the engine is pulled-up may be adjusted based on the battery's state of charge with the threshold lowered when the battery has more charge. This reduces the frequency with which the engine is pulled-up to heat the catalyst when the battery can meet the power demand while taking advantage of a more frequent engine pull-up when the battery is depleted to meet the power demand and synergistically heat the catalyst.

In this way, by initially operating an engine at a higher power to pre-heat the catalyst and subsequently operating the engine at a lower power to enable sufficient catalyst heating, an engine-off duration over a given vehicle drive cycle can be extended. By reducing the need for frequent engine pull-up, engine operation time is reduced, improving the efficiency and fuel economy of a hybrid vehicle. By intermittently heating the exhaust catalyst, the catalyst is maintained active, reducing cold-start emissions when the engine is operated. Overall, engine cold-start emissions can be balanced with reduced engine run time of a hybrid vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
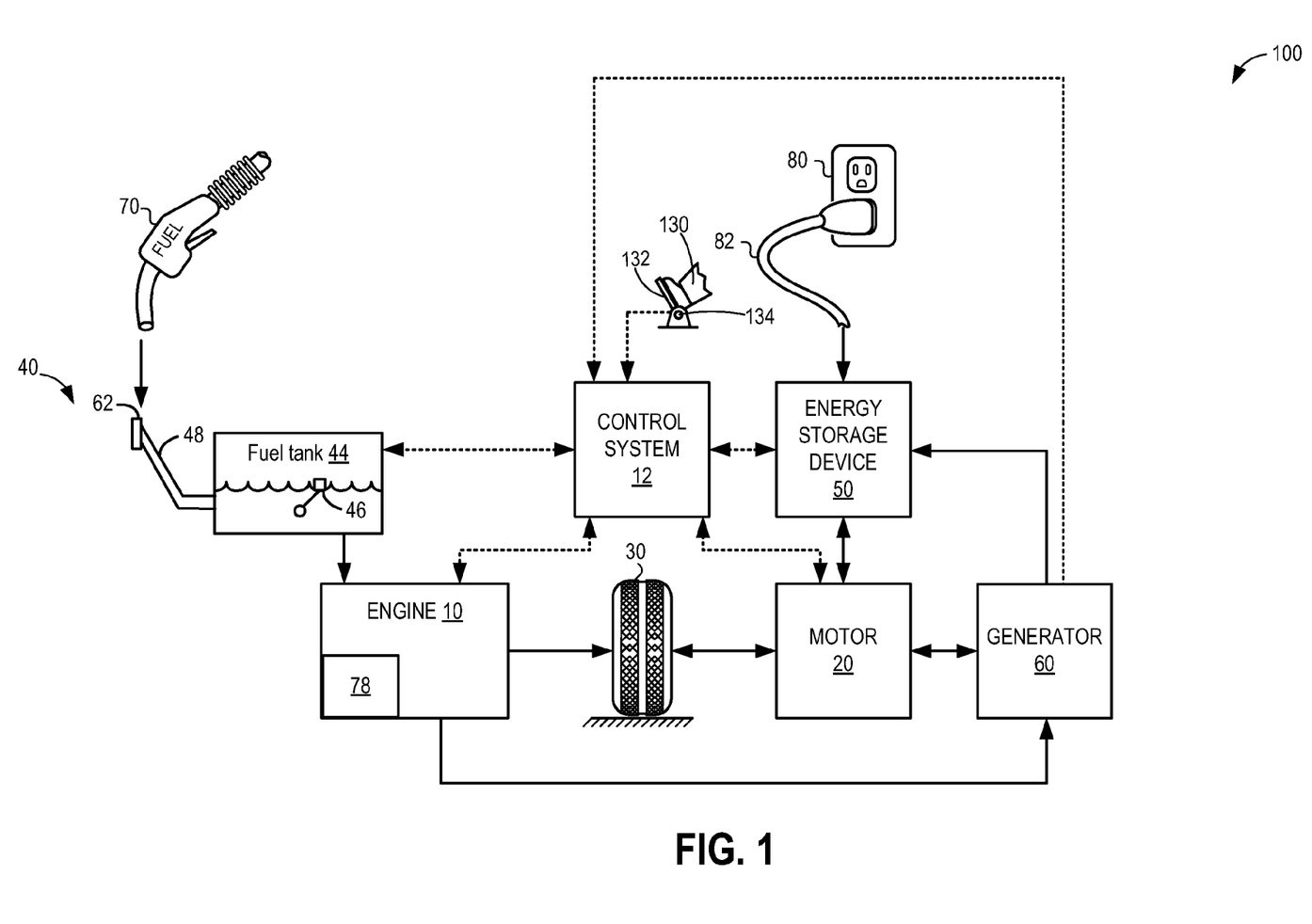
FIG. 1 illustrates an example hybrid vehicle system.
Figure 3:
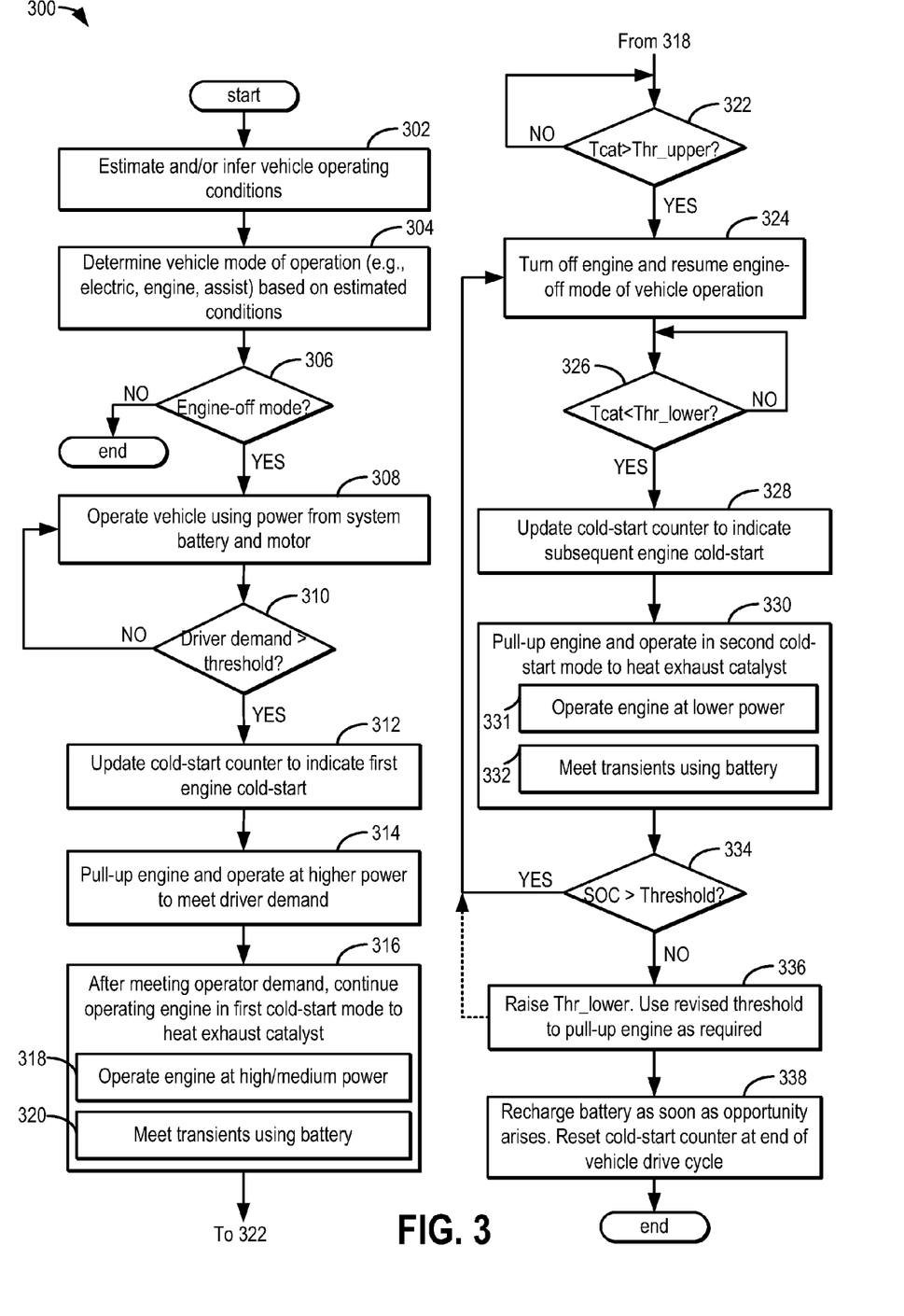
FIG. 3 illustrates a high level flow chart illustrating a routine for pulling up an engine of a hybrid vehicle system to meet operator demand and/or heat an exhaust catalyst.
Figure 4:
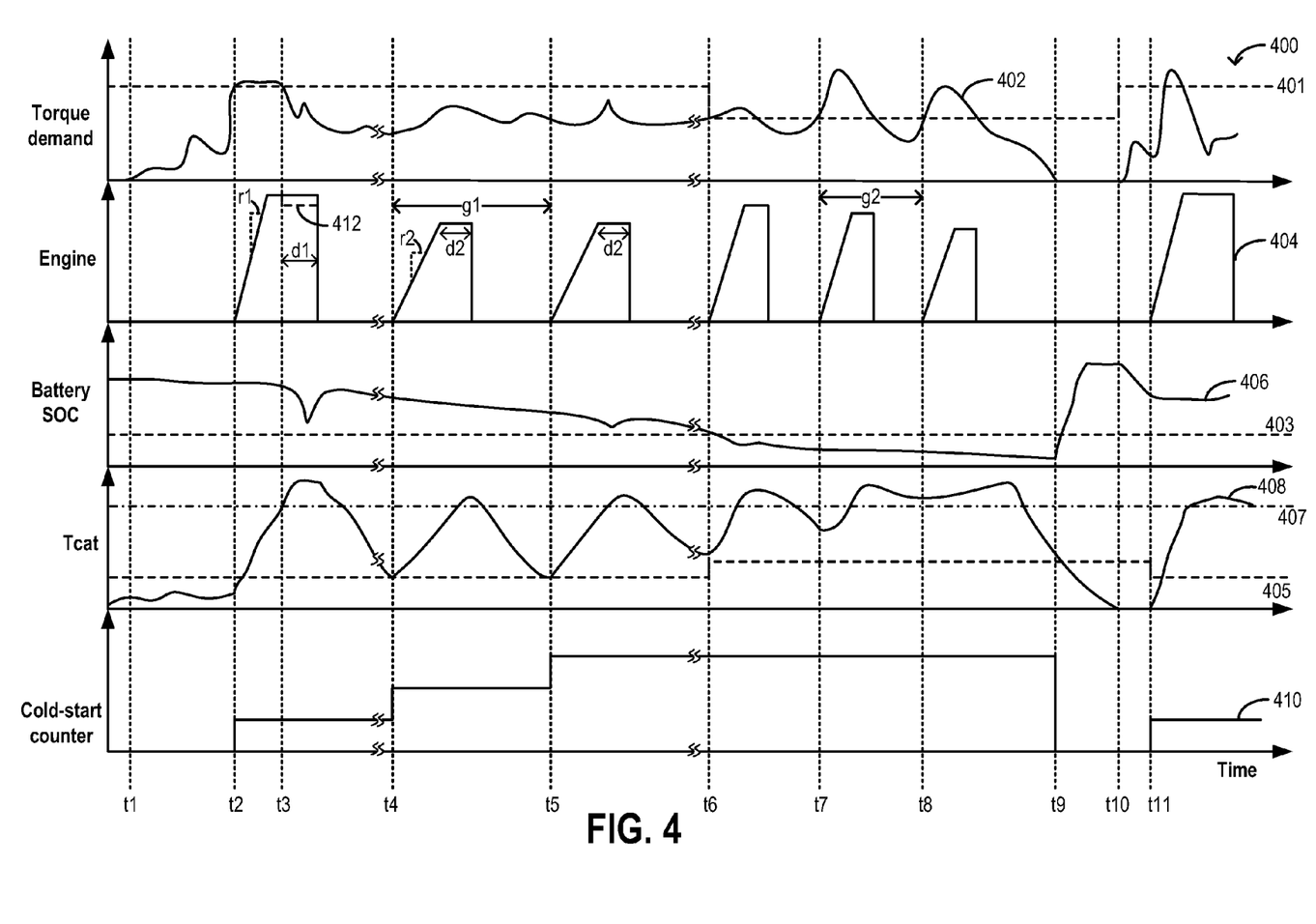
FIG. 4 illustrates an example engine cold-start operation.

The following description relates to systems and methods for operating a hybrid electric vehicle, such as the plug-in hybrid electric vehicle of FIG. 1. Based on operator demand and exhaust catalyst temperature, the vehicle may be operated with power provided by only the system battery and/or motor, or with power supplemented by an engine (such as the engine of FIG. 2). A controller may be configured to perform a routine, such as shown in FIG. 3, to initially pull-up an engine of the hybrid vehicle system to meet operator demand and opportunistically pre-heat the exhaust catalyst. The controller may subsequently pull-up the engine to heat the exhaust catalyst and reduce cold-start emissions. A lower, and shorter burst of engine power may be provided to heat the catalyst at each cold-start following the initial engine pull-up to maintain the catalyst active while extending an engine-off period. An example engine cold-start operation over a vehicle drive cycle is shown at FIG. 4. In this way, engine operation time of a hybrid vehicle is limited to improve fuel economy while maintaining an exhaust catalyst active to improve vehicle emissions.

FIG. 1 illustrates an example vehicle propulsion system 100. Vehicle propulsion system 100 includes a fuel burning engine 10 and a motor 20. As a non-limiting example, engine 10 comprises an internal combustion engine and motor 20 comprises an electric motor. Motor 20 may be configured to utilize or consume a different energy source than engine 10. For example, engine 10 may consume a liquid fuel (e.g. gasoline) to produce an engine output while motor 20 may consume electrical energy to produce a motor output. As such, a vehicle with propulsion system 100 may be referred to as a hybrid electric vehicle (HEV). Specifically, propulsion system 100 is depicted herein as a plug-in hybrid electric vehicle (PHEV).

Figure 2:
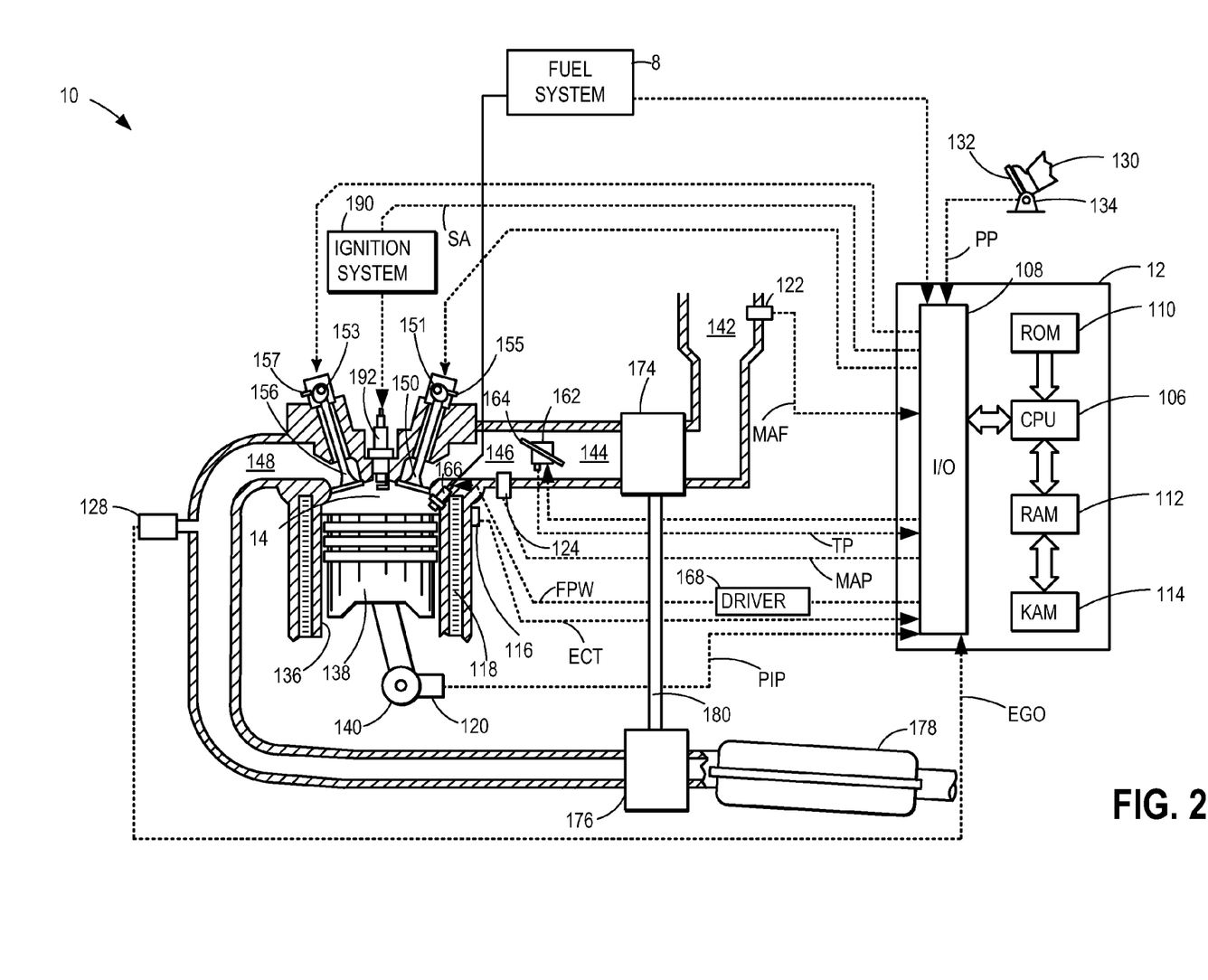
FIG. 2 illustrates an example internal combustion engine of the hybrid vehicle system.

Engine 10 may include an engine intake and engine exhaust, as further elaborated with reference to FIG. 2. The exhaust passage of the engine may include an emissions control device including an exhaust catalyst 78. The exhaust catalyst may include, for example, a three way catalyst (TWC) or an alternate catalytic converter. As such, exhaust catalyst 78 may need to be warmed to an activation temperature, also known as a light-off temperature, to be catalytically active. Exhaust emissions released during engine operation before exhaust catalyst 78 is sufficiently warmed are known as cold-start emissions and are a large contributor to total engine exhaust emissions. Thus, various approaches are used to expedite heating of the exhaust catalyst to reduce cold-start emissions. For example, exhaust heat from engine combustion can be used to heat the catalyst. In addition, ignition spark timing retard may be used to increase the heat of combustion to further expedite catalyst heating. However, the reduced engine run time of a hybrid vehicle generates insufficient heat for keeping the exhaust catalyst activated. As elaborated herein with reference to FIG. 3, the reduce engine run time of a hybrid vehicle can be balanced with cold-start emissions by pulling up the engine in different cold-start modes including an initial cold-start mode where the engine is pulled up in response to a power demand and operated at higher power for a longer time to pre-heat the catalyst (more aggressively). Subsequently, the engine is pulled up in a different cold-start mode in response to catalyst cooling and operated at a lower power for a shorter time to re-heat the catalyst (less aggressively). By using this combination of cold-start modes, the frequency of engine pull-up required to maintain the catalyst active is reduced.

Returning to FIG. 1, vehicle propulsion system 100 may be operated in a variety of different modes depending on vehicle operating conditions. Some of these modes may enable engine 10 to be maintained in an off state (or deactivated state) where combustion of fuel at the engine is discontinued. For example, under select operating conditions, motor 20 may propel the vehicle via drive wheel 30 while engine 10 is deactivated.

During other operating conditions, engine 10 may be deactivated while motor 20 is operated to charge energy storage device 50 via regenerative braking. Therein, motor 20 may receive wheel torque from drive wheel 30 and convert the kinetic energy of the vehicle to electrical energy for storage at energy storage device 50. Thus, motor 20 can provide a generator function in some embodiments. However, in other embodiments, a dedicated energy conversion device, herein generator 60 may instead receive wheel torque from drive wheel 30 and convert the kinetic energy of the vehicle to electrical energy for storage at energy storage device 50.

During still other operating conditions, engine 10 may be operated by combusting fuel received from fuel system 40. For example, engine 10 may be operated to propel the vehicle via drive wheel 30 while motor 20 is deactivated. During other operating conditions, both engine 10 and motor 20 may each be operated to propel the vehicle via drive wheel 30. A configuration where both the engine and the motor may selectively propel the vehicle may be referred to as a parallel type vehicle propulsion system. Note that in some embodiments, motor 20 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 20, which may in turn propel the vehicle via drive wheel 30. For example, during select operating conditions, engine 10 may drive generator 60, which may in turn supply electrical energy to one or more of motor 20 or energy storage device 50. As another example, engine 10 may be operated to drive motor 20 which may in turn provide a generator function to convert the engine output to electrical energy, where the electrical energy may be stored at energy storage device 50 for later use by the motor. The vehicle propulsion system may be configured to transition between two or more of the operating modes described above depending on operating conditions.

Fuel system 40 may include one or more fuel storage tanks 44 for storing fuel on-board the vehicle and for providing fuel to engine 10. For example, fuel tank 44 may store one or more liquid fuels, including but not limited to: gasoline, diesel, and alcohol fuels. In some examples, the fuel may be stored on-board the vehicle as a blend of two or more different fuels. For example, fuel tank 44 may be configured to store a blend of gasoline and ethanol (e.g. E10, E85, etc.) or a blend of gasoline and methanol (e.g. M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle and/or to recharge energy storage device 50 via motor 20 or generator 60.

Fuel tank 44 may include a fuel level sensor 46 for sending a signal regarding a fuel level in the tank to control system (or controller) 12. Fuel level sensor 46 may comprise a float connected to a variable resistor, as shown. Alternatively, other types of fuel level sensors may be used. The level of fuel stored at fuel tank 44 (e.g. as identified by the fuel level sensor) may be communicated to the vehicle operator. Fuel system 40 may periodically receive fuel from an external fuel source. For example, in response to a fuel level in the fuel tank falling below a threshold, a fuel tank refill request may be made and the vehicle operator may stop the vehicle for refilling. Fuel may be pumped into the fuel tank from fuel dispensing device 70 via a refueling line 48 that forms a passageway from a refueling door 62 located on an outer body of the vehicle.

Control system 12 may communicate with one or more of engine 10, motor 20, fuel system 40, energy storage device 50, and generator 60. Specifically, control system 12 may receive feedback from one or more of engine 10, motor 20, fuel system 40, energy storage device 50, and generator 60 and send control signals to one or more of them in response. Control system 12 may also receive an indication of an operator requested output of the vehicle propulsion system from a vehicle operator 130. For example, control system 12 may receive feedback from pedal position sensor 134 which communicates with pedal 132. Pedal 132 may refer schematically to an accelerator pedal (as shown) or a brake pedal.

Energy storage device 50 may include one or more batteries and/or capacitors. Energy storage device 50 may be configured to store electrical energy that may be supplied to other electrical loads residing on-board the vehicle (other than the motor), including a cabin heating and air conditioning system (e.g., HVAC system), an engine starting system (e.g., starter motor), headlights, cabin audio and video systems, etc.

Energy storage device 50 may periodically receive electrical energy from an external power source 80 not residing in the vehicle. As a non-limiting example, vehicle propulsion system 100 may be configured as a plug-in hybrid electric vehicle (HEV), whereby electrical energy may be supplied to energy storage device 50 from power source 80 via an electrical energy transmission cable 82. During a recharging operation of energy storage device 50 from power source 80, electrical transmission cable 82 may electrically couple energy storage device 50 and power source 80. While the vehicle propulsion system is operated to propel the vehicle, electrical transmission cable 82 may be disconnected between power source 80 and energy storage device 50. Control system 12 may estimate and/or control the amount of electrical energy stored at the energy storage device, referred to herein as the state of charge (SOC).

In other embodiments, electrical transmission cable 82 may be omitted, where electrical energy may be received wirelessly at energy storage device 50 from power source 80. For example, energy storage device 50 may receive electrical energy from power source 80 via one or more of electromagnetic induction, radio waves, and electromagnetic resonance. As such, it should be appreciated that any suitable approach may be used for recharging energy storage device 50 from the external power source 80. In this way, motor 20 may propel the vehicle by utilizing an energy source other than the fuel utilized by engine 10.

As elaborated in FIG. 2, controller 12 may receive input data from various sensors, process the input data, and trigger various actuators in response to the processed input data.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, different fuel volatilities, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 106 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 166, throttle 162, spark plug 192, intake/exhaust valves and cams, etc. The controller may receive input data from the various sensors, process the input data, and trigger the actuators in response to the processed input data based on instruction or code programmed therein corresponding to one or more routines. An example control routine is described herein with regard to FIG. 3.

Now turning to FIG. 3, an example method 300 is shown for performing one or more engine cold-start operations over a vehicle drive cycle to heat an engine exhaust catalyst and keep it activated. The method enables a reduction in cold-start emissions while also extending an engine-off duration between cold-starts.

At 302, vehicle operating conditions may be estimated and/or inferred. For example, the control system may receive sensor feedback from one or more sensors associated with the vehicle propulsion system components, as described above. Operating conditions estimated may include, for example, an indication of vehicle operator requested output or torque (e.g., based on a pedal position), a fuel level at the fuel tank, engine fuel usage rate, engine temperature, state of charge (SOC) of the on-board energy storage device, ambient conditions including humidity and temperature, engine coolant temperature, climate control request (e.g., air-conditioning or heating requests), etc.

At 304, based on the estimated vehicle operating conditions, a mode of vehicle operation may be selected. As such, the vehicle may be a hybrid vehicle including an engine, a battery and a motor, wherein each of the battery, motor, and engine are coupled to a vehicle drivetrain for providing power to vehicle wheels. Thus, at 304, it may be determined whether to operate the vehicle in an electric mode (with the vehicle being propelled using energy from the battery and/or the motor), or an engine mode (with the vehicle being propelled using energy from the engine), or an assist mode (with the vehicle being propelled using at least some energy from the battery and/or motor and at least some energy from the engine). As such, each of the engine mode and the assist mode may constitute an engine-on mode of vehicle operation wherein the vehicle is operated with at least some power from the engine, while the electric mode may constitute an engine-off mode of vehicle operation wherein the vehicle is operated with no power drawn from the engine and all the demanded power being met the system battery and/or motor. For example, when the operator torque demand is lower (e.g., lower than a threshold amount), the vehicle may be operated in the electric mode (that is, engine-off mode). In comparison, when the operator torque demand is higher (e.g., higher than the threshold amount), the vehicle may be operated in the engine or assist mode (that is, engine-on mode).

At 306, it may be determined if an engine-off mode of vehicle operation was selected. If yes, then at 308, the vehicle may be operated in the electric mode with the system battery and/or motor being used to propel the vehicle and meet the operator torque demand. If an electric mode is not confirmed, the routine may end. As such, during an engine-off mode, insufficient heat is generated from vehicle operation to warm and activate the engine exhaust catalyst. In addition, if the exhaust catalyst were already warm, during the engine-off mode, the exhaust catalyst may undergo some cooling (based on the duration of the engine-off mode as well as the ambient temperature conditions). For example, if the vehicle is operated with the engine-off for an extended amount of time, the exhaust catalyst may cool to or below the catalyst activation temperature. As another example, if the vehicle is sitting still in the electric mode for a duration, such as in a tunnel or a parking lot, the exhaust may cool to or below the catalyst activation temperature. This can lead to increased cold-start emissions when the engine is subsequently shifted to an engine-on mode as well as increased engine run time (since the engine has to be run to first heat the catalyst). To reduce the cold-start emissions, the controller may perform one or more engine cold-starts, as described below. The cold-starts include infrequent engine pull-ups that allow the exhaust catalyst to be heated intermittently so as to reduce cold-start emissions.

At 310, while the vehicle is in the engine-off mode, it may be determined if there is a sudden increase in torque demand. For example, it may be determined if the operator torque demand is higher than a threshold such that only the battery and/or motor are not able to meet the torque demand. If there is no increase in drive demand, the routine returns to 308 to continue providing power for driving the vehicle from the battery and/or motor. If the driver demand is higher, then the engine is operated to meet the power demand. As such, since this is the first time the engine is pulled-up in the vehicle drive cycle, this may constitute a first engine cold-start wherein the exhaust catalyst has not been sufficiently warmed or activated. Accordingly, at 312, the routine includes before (or while) initially pulling up the engine, indicating a first engine cold-start on a counter. The counter may be cold-start counter stored in the controller's memory. As elaborated herein, the counter may be started when the engine is first pulled-up in a given single vehicle drive cycle, and then the counter may be incremented every time the engine is pulled-up for a cold-start to heat the exhaust catalyst in the same single vehicle drive cycle. The counter may then be reset when the given vehicle drive cycle ends (and restarted at the next vehicle drive cycle).

As used herein, a single vehicle drive cycle may be defined as vehicle operation starting from an operator vehicle key-on event (when the operator indicates that vehicle operation is to be initiated) to a subsequent operator vehicle key-off event (when the operator indicates that vehicle operation is to be discontinued). In one example, a vehicle key-on event may be confirmed when the vehicle operator inserts and turns a key in the vehicle's keyhole slot, while a vehicle key-off event may be confirmed when the operator turns and removes the key from the keyhole slot. However, in alternate vehicle embodiments, such as those having a start/stop button and/or a passive key, a vehicle key-on event may be confirmed when the vehicle operator presses a start/stop button of the vehicle to a start position while a vehicle key-off event is confirmed when the vehicle operator presses the start/stop button to a stop position. In addition, a passive key may need to be either inserted in a keyhole slot, or the passive key may need to be inside the vehicle to indicate the presence of the driver to a vehicle controller.

After initiating counting on the cold-start counter, at 314, the routine includes, initially pulling up the engine to a higher power in response to operator torque demand. Initially pulling up the engine in response to operator torque demand includes, in response to operator torque demand being higher than an amount that can be met by the battery and/or the motor, spinning up the engine to the higher power to meet the operator torque demand. For example, the engine pull-up may include the engine being spun by the generator quickly to ~1000 rpm, while the engine is fueled and sparked on the way up. In one example, the engine may be pulled up to provide a peak power output of 80 Nm while being spun at 1500-1700 rpm. When pulling up the engine to meet the driver torque demand, larger throttle adjustments may be tolerated. For example, the throttle may be opened to a larger degree to provide more air to meet the increased torque demand.

While the engine is spun-up to meet the elevated driver demand, engine operation may be opportunistically used to sufficiently heat the exhaust catalyst. For example, the catalyst may be heated more than otherwise required so as to compensate for the cooling that will occur when the engine is subsequently shut down and the vehicle is returned to an engine-off mode. By pre-heating the catalyst, a duration between the initial engine cold-start and a subsequent engine cold-start can be increased, providing fuel economy benefits without degrading emissions. Thus, at 316, the routine includes, after initially pulling up the engine to the higher power to meet the operator torque demand, continuing to operate the engine in a first cold-start mode to heat the exhaust catalyst. In particular, at 318, the routine includes holding or maintaining the engine at the higher power for a first, longer duration (e.g., ~45 seconds to 1 minute) irrespective of changes in operator torque demand to enable catalyst heating. Thus, even if the driver demand drops and engine operation is not required to meet the torque demand, engine operation at the higher power is continued to sufficiently heat the exhaust catalyst. It will be appreciated that at 318, the engine output may be maintained in the higher power range to enable catalyst heating, or, in alternate embodiments, the engine may be initially pulled-up to a higher power range to meet the operator demand, and then shifted to, and held at a medium power range (e.g., with a power output of 60-80 Nm and 1500-1700 rpm engine speed) to heat the exhaust catalyst when operating in the first cold-start mode.

At 320, any transient torque demands may be met with the system battery. In other words, the engine is held in a steady-state with minimum adjustments to throttle position to heat the exhaust catalyst while power is drawn from the battery in case of a sudden spike in power demand. As such, the throttle is held steady when operating in the first cold-start mode to reduce hydrocarbon emissions. In particular, the torque request is held steady in the first cold-start mode, which results in steadier throttle. As such, the throttle may move slowly as the friction losses reduce, as well as to counteract a one-time movement in VCT position.

Optionally, while operating the engine at medium-high power, spark timing may be retarded to further assist in heating the exhaust catalyst. For example, a smaller amount of spark retard may be used when operating in the first cold-start mode to heat the exhaust catalyst since a larger amount of air mass is available in the first mode. The duration of engine operation (and/or amount of spark retard applied) may be based on catalyst temperature at engine-start, as well as ambient conditions. For example, when the catalyst is cooler at the engine start and a difference between the catalyst temperature and activation temperature is higher, the engine may be continued in the higher power operation for a longer time. Likewise, when the ambient temperatures are colder, the engine may be continued in the higher power operation for a longer time to compensate for the faster cooling anticipated during the subsequent engine-off mode. Overall, the first engine cold-start mode enables the catalyst to be made extra hot so that it can soak afterwards when the engine is turned off.

At 322, the routine includes confirming if the catalyst temperature is at or above an upper threshold temperature (Thr_upper). In one example, the upper threshold temperature is 1200° C. Therein, it may be confirmed that the catalyst has been sufficiently heated and is sufficiently activated. As such, until the catalyst is sufficiently heated, the controller may maintain engine operation in the medium-high power range in the first cold-start mode. Upon confirmation that the catalyst is sufficiently heated, at 324, the routine includes pulling down the engine and resuming an engine-off mode of vehicle operation.

As such, while the vehicle is in the engine-off mode, the exhaust catalyst may undergo some cooling. The cooling of the catalyst may be based on, for example, vehicle operating conditions (e.g., whether the vehicle is moving or standing still, whether the vehicle is travelling through a tunnel or an open road, etc.), ambient conditions (how cold the ambient temperature is), etc. For example, the catalyst may cool faster when the ambient conditions are cooler.

At 326, the routine includes confirming if the catalyst temperature is at or below a lower threshold temperature (Thr_lower). For example, it may be determined if the catalyst is approaching a lower temperature threshold below which the catalyst activity may be degraded. As such, if engine operation is requested (due to increased operator demand) while the catalyst temperature is below the lower threshold, engine emissions may be degraded. Therefore, to reduce emissions, an engine cold-start may be performed wherein the engine is pulled-up to heat the exhaust catalyst.

The (lower) threshold temperature may be based at least on a battery state of charge. For example, at 326, the battery state of charge may be higher than a threshold charge (e.g., the battery is sufficiently charged), and the engine may be pulled-up in response to catalyst temperature being lower than a first threshold (e.g., 600° C.). In comparison, as elaborated below (at 336), when the battery state of charge is lower than the threshold charge (e.g., the battery charge is depleted), the engine may be pulled-up in response to catalyst temperature being lower than a second threshold, the second threshold being higher than the first threshold. For example, when the battery state of charge is higher (such as at 326), the engine pull-up may be in response to catalyst temperature being at or near 600° C. while when the battery state of charge is lower (such as at 336), the engine pull-up may be in response to catalyst temperature being at or near 900° C.

At 328, the routine includes incrementing a count on the cold-start counter to indicate that a cold-start subsequent to the initial cold-start is being performed over the given vehicle drive cycle. At 330, the routine subsequently includes, within the single vehicle drive cycle, pulling up the engine in response to catalyst temperature and operating the engine in a second cold-start mode, different from the first cold-start mode used when the engine was initially pulled-up. The subsequent pulling up of the engine in response to catalyst temperature includes, at 331, pulling up the engine to a lower power in response to catalyst temperature being lower than the threshold. The controller may then hold the engine at the lower power for a second, shorter duration to heat the catalyst. For example, the engine may be held in the lower power for 45 seconds. In one example, the engine may be pulled up to provide a peak power output of 25-35 Nm while being spun at 1000 rpm. By pulling the engine to, and holding the engine at the lower power output in response to catalyst temperature, the catalyst can be reactivated.

Further, at 332, as at 320, while the engine is held at the lower power, transient torque demands may be met by the system battery and/or motor. In other words, the engine is held in a steady-state with minimum adjustments to throttle position to heat the exhaust catalyst while power is drawn from the battery in case of a sudden spike in power demand. As such, the throttle is held steady when operating in the second cold-start mode to reduce hydrocarbon emissions. In one example, the throttle position is held fixed while the engine is held at the lower power to heat the catalyst.

In one example, the initial pulling up of the engine when operating in the first cold-start mode may include pulling up the engine at a first, faster rate to the higher power, while the subsequent pulling up of the engine when operating in the second cold-start mode includes pulling up the engine at a second, slower rate to the lower power. In other examples, the engine pull-up during each of the first and second cold-starts may be at substantially the same speed. In a further example, once the decision to pull-up the engine is made during either cold-start mode, the engine may go directly to the selected operating point (of higher or lower power).

The routine may then proceed to 334 to confirm if the battery state of charge (SOC) is at or above a threshold amount of charge. For example, it may be confirmed that the battery is sufficiently charged to meet the operator torque demands (alone, or along with the motor). If there is sufficient charge in the battery, the routine returns to 324 to shutdown the engine and resume an engine-off mode of operation. The controller may continue reiterating steps 324 through 334 over the vehicle drive cycle, while the battery is sufficiently charged, to pull-up the engine to a lower power whenever the catalyst temperature falls to the lower threshold (600° C.) and catalyst heating is required. As such, by initially heating the catalyst more intensively by operating the engine at a higher power, and subsequently heating the catalyst by operating the engine at a lower power, the catalyst can be maintained active while extending a duration between subsequent engine cold-starts. As such, this improves the drive feel of a hybrid vehicle because the vehicle is run with the engine off for a longer time, as expected by an operator driving a hybrid vehicle. In addition, by prolonging the engine-off duration of the vehicle drive cycle, fuel economy benefits are achieved. At the same time, by keeping the exhaust catalyst warm, engine cold-start emissions are reduced.

Over the vehicle drive cycle, as the controller continues to operate the vehicle in the engine-off mode with the engine being pulled up infrequently to warm the exhaust catalyst, driver demand may be met by the system battery and motor, causing the battery state of charge to gradually drop. As such, when the engine is off and the battery has sufficient charge (e.g., a SOC higher than a threshold amount), the vehicle is operated in a charge depleting mode, while when the engine is off and the battery has insufficient charge (e.g., a SOC lower than a threshold amount), the vehicle is operated in a charge sustaining mode. In one example, after 6 cycles of steps 324-334 (or about 21 miles of vehicle travel in the engine-off mode), the battery charge may start to deplete and the vehicle may shift from the charge depleting mode to the charge sustaining mode.

In response to the battery SOC being lower than the threshold, at 336, the (lower) threshold temperature (Thr_lower) at which the engine is pulled-up is raised. As previously elaborated, the (lower) threshold temperature may be based at least on a battery state of charge. For example, at 336, in response to the battery state of charge being lower than a threshold charge, the lower threshold temperature may be raised (herein from 600° C. to 900° C.). The routine may then use the revised threshold to pull-up the engine. In particular, the routine may return to 324 and reiterate steps 324-330 with the revised threshold, and with the engine pulled-up to be operated in the second cold-start mode in response to catalyst temperature being at or near the revised (higher) threshold temperature. As such, when the battery SOC is lower, and the vehicle is in the charge sustaining mode, the engine may be pulled-up more often to assist the motor in meeting the operator demand. Due to the more frequent engine pull-ups, the catalyst may remain sufficiently heated, and an engine pull-up for heating the catalyst may not be required as frequently. This allows the second threshold used when the battery SOC is lower to be raised relative to the first threshold used when the battery SOC is higher.

In one example, the first and second thresholds may be fixed and discrete values. For example, the first threshold may be based on driver demand and vehicle speed. The controller may use a 3D table having a multiplier based on vehicle speed and driver torque demand to determine the first threshold. The 3D table may also be used to determine the second threshold based on vehicle speed, driver demand, and battery state of charge. The 3D tables may also include a hysteresis factor to compensate for hysteresis effects between the thresholds. In an alternate example, the second threshold may be based on the first threshold. For example, a multiplier based on the battery's state of charge may be used to shift from the first threshold to the second threshold. While the depicted routine shows the first and second thresholds as discrete values, in still other examples, the first threshold may be gradually blended to the second threshold based on the battery SOC.

At 338, the routine includes indicating that the battery should be recharged as soon as an opportunity arises. For example, at the end of the given drive cycle, the battery may be recharged. In one example, at a subsequent vehicle key-off event, the vehicle drive cycle may be completed and the vehicle may be charged with electrical energy from an external power source not residing in the vehicle (such as power source 80 of FIG. 1). The electrical energy may be supplied to recharge the battery from the power source via a transmission cable. At 338, the routine further includes, resetting the cold-start counter upon completion of the given single vehicle drive cycle. For example, when the vehicle is recharged at the next key-off event, the cold-start counter may be reset. The counter may then be restarted at the next vehicle drive cycle. For example, at the next drive cycle, where the battery has been charged, the counting on the cold-start counter may be initiated in response to the first cold-start of the drive cycle (where the engine is pulled-up and operated at higher power in the first engine cold-start mode), and the counting may be incremented in response to each subsequent cold-start of the drive cycle (wherein the engine is pulled-up and operated at lower power in the second cold-start mode). In this way, exhaust cold-start emissions and engine run time are balanced in a hybrid vehicle.

In one example, a hybrid vehicle system may comprise an engine including an exhaust catalyst, a temperature sensor coupled to the exhaust catalyst for indicating a catalyst temperature; a battery, a motor, and a driveline coupling vehicle wheels to an output of each of the engine, battery and motor. The vehicle system may include a controller with computer readable instructions for, during a given vehicle drive cycle, monitoring the catalyst temperature while operating the vehicle in an engine-off mode. In response to operator torque demand being higher than a threshold demand, the controller may operate the engine in a first cold-start mode with the engine pulled-up (at a first, faster rate) to a first, higher power to meet the torque demand. The engine is then maintained at the first power for a first, longer duration to heat the exhaust catalyst. After the initial engine cold-start, and during the same drive cycle, in response to catalyst temperature falling below a threshold temperature, the controller may operate the engine in a second cold-start mode with the engine pulled-up (at a second, slower rate) to a second, lower power for a second, shorter duration to heat the exhaust catalyst. The controller may include a cold-start counter for counting the subsequent cold-starts following the initial cold-start. In particular, the counter may be started when the vehicle is operated in the first cold-start mode. The counter is then incremented each time the vehicle is operated in the second cold-start mode.

Now turning to FIG. 4, example operation of a hybrid vehicle system, including operation of the vehicle's engine in the first and second cold-start modes to enable catalyst heating is described. Specifically, map 400 depicts operator torque demand at plot 402, engine operation at plot 404, battery state of charge (SOC) at plot 406, exhaust catalyst temperature (Tcat) at plot 408, and a cold start counter at plot 410. All plots are depicted over time of vehicle operation (along the x-axis).

At t1, a vehicle key-on event may be confirmed. For example, a vehicle operator may insert a key into a keyhole slot and indicate a desire to operate the vehicle. Herein, the vehicle is a hybrid vehicle system having each of an engine, a battery and a motor coupled to a driveline for providing propulsion power to vehicle wheels. When the key-on event is confirmed, the battery is sufficiently charged (plot 406), with a state of charge (SOC) higher than a threshold amount of charge 403. In addition, an exhaust catalyst of the engine may be cold, with a catalyst temperature (plot 408) below a lower temperature threshold 405. As such, the catalyst may be inactive at this temperature.

Between t1 and t2, the operator torque demand (plot 402), as inferred from an accelerator pedal for example, may be met by the system battery and/or motor (not shown). In particular, due to the battery being sufficiently charged and the torque demand being below a threshold torque demand 401, the vehicle may be operated in an engine-off mode (herein also referred to as electric mode) with torque being provided by only the battery and/or motor, and with the engine shutdown. As such, by operating the vehicle in the electric mode, fuel consumption (e.g., gasoline fuel consumption) is reduced.

At t2, operator torque demand may exceed threshold torque demand 401 such that the torque cannot be met by the battery and/or motor alone. To meet the demand, the engine may need to be pulled up. Thus, at t2, the engine may be pulled up by starting engine spin-up with a generator while adding fuel and spark to the spinning engine. As such, since the exhaust catalyst is cold when the engine is started, this initial engine pull-up may constitute a first engine cold-start. Accordingly, the engine may be operated in a first engine cold-start mode. In addition, a cold-start counter of the controller may start counting by noting this as a first cold-start event (plot 410).

During the initial engine pull-up, the engine may be quickly pulled-up at a rate r1 (see steeper slope r1) to a higher peak power output (e.g., 60-80 Nm). The engine may be held at the higher power output to meet the power demand. As such, while the engine is operated to meet the power demand, heat is generated from combustion, causing the exhaust catalyst temperature to rise above lower temperature threshold 405, thereby activating the exhaust catalyst.

At t3, the operator torque demand may fall below threshold torque demand 401 and further engine operation may not be required to meet the demand. However, to improve emissions by enabling the catalyst to remain active for an extended period of time, while the engine is pulled-up in the first cold-start mode, the engine may be held at the higher power for a duration (plot 404) to allow for sufficient heating of the catalyst to a temperature at or above upper threshold temperature 407 (see plot 408). In other words, engine operation during the initial engine pull-up may be extended to opportunistically heat the catalyst so that the catalyst remains hot and active for an extended duration after the engine is shut down. While the engine is held at the higher power for catalyst heating, transient torque demands may be met by the system battery. For example, in response to a sudden increase in torque demand shortly after t3, the engine is held steady (at the higher power) while the torque transient is met by the battery, leading to a sudden dip in battery SOC (plot 406).

While the depicted example shows the engine power being maintained high for a duration d1 after t3, in alternate embodiments, once the increased torque demand has subsided (at t3), the engine may be shifted to a medium (but still elevated) power output for the duration to heat the catalyst (e.g., from 80 Nm to 60 Nm), as shown by segmented section 412. In such an embodiment, a larger throttle adjustment may be permitted between t2 and t3 when the engine is operated to meet the elevated torque demand while only a smaller throttle adjustment may be permitted for the duration after t3 when the engine is operated to heat the exhaust catalyst. In other words, steady-state operation at a higher power may be used after t3 to heat the catalyst.

While not depicted, it will be appreciated that in some embodiments, spark ignition timing retard may be used during the engine cold-start operation to assist in catalyst heating. However, since the first engine cold-start operation has higher load and air mass, a relatively smaller amount of spark retard may be required to heat the catalyst. In addition, the lower amount of spark retard may improve engine efficiency when operating in the first cold-start mode. In comparison, since the second engine cold-start operation has a lower load and air mass, a relatively larger amount of spark retard may be required to heat the catalyst. In addition, the larger amount of spark retard may be delivered more easily. Thus, in one example, during the first cold start, while the engine is operating in the first engine cold-start mode, ignition spark timing may be retarded by a smaller amount.

Once duration d1 has elapsed and the catalyst is sufficiently heated (to or above the upper threshold temperature 407), the engine may be pulled down, the first cold-start mode may be discontinued, and vehicle operation in the engine-off mode (with power provided by the motor and/or the battery) is resumed. As such, once the engine is shut down, and no further heat from combustion is generated, the exhaust catalyst temperature may start to slowly fall. However, by having heated the exhaust catalyst substantially during the initial cold-start, the time taken for the catalyst to cool down to lower temperature threshold 405 (and thereby the time taken by the vehicle to continue operating with the engine off) is extended. For example, a longer duration may elapse between t3 and t4.

At t4, the catalyst temperature is determined to be at lower threshold temperature 405. As such, below this temperature, the catalyst activity may be degraded, resulting in increased exhaust emissions if the engine is suddenly restarted to meet the torque demand. Thus, at t4, in response to cooling of the exhaust catalyst, an engine cold-start may be performed solely for the purpose of heating the catalyst. Since the exhaust catalyst is cold when the engine is started, this engine pull-up which is subsequent to the initial engine pull-up (at t2) may constitute a subsequent (herein second) engine cold-start. During this subsequent engine cold-start, the engine may be operated in a second engine cold-start mode, different from the first engine cold-start mode used at t2. In addition, the cold-start counter of the controller is incremented (plot 410).

When operating in the second cold-start mode, the engine is pulled-up at a rate r2 to a lower peak power output (e.g., 25-35 Nm) and held at the lower power output for a duration d2 (plot 404) to allow for sufficient heating of the catalyst to a temperature at or above upper threshold temperature 407 (see plot 408). The rate of engine pull-up (r2) in the second cold-start mode may be slower than the rate of engine pull-up (r1) in the first engine cold-start mode (see that slope r2 is shallower than slope r1). As such, engine operation during this engine pull-up is performed only to heat the catalyst and not to meet the torque demand. In the depicted example, the duration d1 of holding the engine in the higher power during the initial engine pull-up (when operating in the first cold-start mode) is longer than the duration d2 of holding the engine in the lower power during the subsequent engine pull-up (when operating in the second cold-start mode). In other examples, the durations d1 and d2 may be substantially similar.

Once duration d2 has elapsed and the catalyst is sufficiently heated (to or above the upper threshold temperature 407), the engine may be pulled down, the second cold-start mode may be discontinued, and vehicle operation in the engine-off mode (with power provided by the motor and/or the battery) is resumed. As such, once the engine is shut down, and no further heat from combustion is generated, the exhaust catalyst temperature may start to slowly fall.

At t5, as at t4, the catalyst temperature may again drop to the lower threshold temperature 405, triggering another subsequent engine cold-start where the engine is operated in the second cold-start mode. Herein, as at t4, the engine is pulled-up to the lower power output and held at the lower power output for duration d2 (plot 404) to allow for sufficient heating of the catalyst to a temperature at or above upper threshold temperature 407 (see plot 408). In addition, the cold-start counter of the controller is incremented (plot 410).

While the engine is held at the lower power for catalyst heating (at t4 or t5), any transient increase in torque demand may be met by the system battery. For example, in response to a sudden increase in torque demand shortly after t5, the engine is held steady (at the lower power) while the torque transient is met by the battery, leading to a sudden dip in battery SOC (plot 406). Once the catalyst is heated, the engine is pulled down, the second cold-start mode is discontinued, and vehicle operation in the engine-off mode is resumed.

While not depicted, it will be appreciated that in some embodiments, spark ignition timing retard may be used during each of the cold-starts subsequent to the initial cold-start to assist in catalyst heating. For example, during each subsequent cold start, while the engine is operating in the second engine cold-start mode, ignition spark timing may be retarded by a larger amount (that is, larger than the amount of retard applied during the initial cold-start).

As such, operating in the second cold-start mode includes operating the engine at the lower power to extend an engine-off period between subsequent cold-starts of the drive cycle. Thus, engine cold-starts are intermittently performed in response to catalyst temperature with each engine cold start including the engine being pulled-up to, and held at the lower power for a duration. By using an initial cold-start to a higher engine power output followed by a plurality of subsequent intermittent engine cold-starts to a lower engine power output, the catalyst can be maintained substantially at or above the lower threshold temperature, and therefore activated. In addition, this approach allows a duration between subsequent engine cold-starts to be extended. For example, in the depicted scenario, subsequent engine cold-starts are performed after gap periods g1, allowing the vehicle to continue operating with the engine off for gap periods g1.

Between t1 and t6, as the vehicle is operated with power from the motor and/or the battery, the battery charge may be consumed and the battery's SOC may start to fall. In one example, the vehicle may go through 6 cold-start engine pulls and/or 21 miles of vehicle travel before the battery SOC is depleted.

At t6, the battery SOC may reach the threshold amount of charge 403. In response to the drop in battery SOC, the vehicle may shift from a charge depleting mode of vehicle operation to a charge sustaining mode of vehicle operation and adjustments to one or more thresholds may be performed. For example, at t6, the threshold torque demand 401 above which the engine is pulled-up is adjusted based on the battery state of charge with the threshold torque demand lowered as the battery state of charge falls. This enables the engine to be pulled-up at lower torque demands, to compensate for the reduced charge available from the battery. In addition, at t6, the lower threshold temperature 405 at which an engine cold-start is triggered is adjusted based on the battery state of charge with the lower threshold temperature raised as the battery state of charge falls. Since in the charge sustaining mode, the engine is pulled up more often to meet driver demand, sufficient engine combustion heat is generated to warm the exhaust catalyst and frequent engine cold-starts solely for the purpose of catalyst heating may not be required. In view of the reduced requirement for an explicit engine cold-start, the lower threshold temperature is raised.

As such, once in the charge sustaining mode, the engine may be pulled-up more often to meet the torque demand. For example, the engine may be pulled-up at t6, t7, and t8. As a result, a duration between subsequent engine pull-ups (for engine operation of cold-start) is reduced. For example, in the depicted scenario, subsequent engine pull-ups are performed after shorter gap periods g2, allowing the vehicle to continue operating with the engine off for gap periods g2 (shorter than gap period g1).

At t9, a vehicle operator key-off event may be confirmed. For example, a vehicle operator may remove a key from the keyhole slot and indicate a desire to stop operating the vehicle to recharge the vehicle battery. The vehicle operator key-off event may indicate the end of the vehicle drive cycle, in response to which the cold-start counter is reset (plot 410). Between t9 and t10, while the vehicle is not being operated, a recharging opportunity may arise and the vehicle battery may be recharged, for example, using power from an external power source. The battery may be fully charged shortly before t10, such that at t10, when a vehicle operator key-on event is confirmed, the hybrid vehicle is ready to be operated in the electric mode.

As such, a single vehicle drive cycle may include vehicle operation from the indication of a first operator vehicle key-on event (such as at t1) to a subsequent vehicle operator key-off event (such as at t9). In other examples, a single vehicle drive cycle may include vehicle operation from the indication of a first operator vehicle key-on event (such as at t1) to a second, subsequent operator vehicle key-on event (such as at t10).

Between t10 and t11, the driver demand may be below threshold torque demand 401 and may be met by operating in the electric mode with power provided by only the battery and/or motor. At t11, as at t2, operator torque demand may exceed threshold torque demand 401 and the engine may need to be pulled up. Thus, at t11, the engine may be pulled up. In addition, since the exhaust catalyst is cold when the engine is started, this engine pull-up may constitute a first engine cold-start of the drive cycle started at t10. Accordingly, the engine may be operated in the first engine cold-start mode and cold-start counter may be reset (plot 410).

In this way, during a first cold-start of a single drive cycle, a controller may operate an engine at a first, higher power for a first, longer duration, and then, during each subsequent cold-start of the drive cycle, the controller may operate the engine at a second, lower power for a second, shorter duration. During the first cold-start, the engine is operated in response to driver demand being higher than a threshold demand, while during each subsequent cold-start, the engine is operated in response to engine exhaust catalyst temperature being lower than a threshold temperature. The controller may initiate counting of cold-start events on a cold-start counter in response to the first cold-start of the single drive cycle, and then incrementally count on the cold-start counter in response to each subsequent cold-start of the drive cycle. The counter may then be reset in response to completion of the single drive cycle. During the first cold-start, the threshold demand may be based on battery state of charge, while during each subsequent cold-start, the threshold temperature may be based on the battery state of charge. In particular, during the first cold-start, the threshold demand may be lowered as the battery state of charge falls, while during each subsequent cold-start, the threshold temperature may be raised as the battery state of charge falls.

In this way, by heating an exhaust catalyst relatively more aggressively during a first engine pull-up and then heating the exhaust catalyst relatively less aggressively during each subsequent engine pull-up, a frequency of engine cold-starts is reduced. By maintaining engine operation at higher power when the engine of a hybrid vehicle is first pulled-up to meet operator demand, the engine pull-up can be opportunistically extended to heat an exhaust catalyst and maintain the catalyst active for a longer engine-off period. By subsequently operating the engine at a lower power, intermittently, the catalyst can be maintained hot and activated. By keeping the catalyst warm, cold-start emissions can be reduced. At the same time, frequent engine pull-ups are reduced, improving the efficiency and fuel economy of a hybrid vehicle. In addition, by reducing the number of unexpected and objectionable engine pull-ups, an operator drive experience is improved. Overall, hybrid vehicle engine run time and cold-start emissions are reduced, improving hybrid vehicle performance.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
within a single vehicle drive cycle,
initially pulling up an engine to, and holding at, a higher power, including pulling the engine at a first, faster rate to the higher power, in response to operator torque demand; and
subsequently pulling up the engine to, and holding at, a lower power, including pulling up the engine at a second, slower rate to the lower power, in response to catalyst temperature.

2. The method of claim 1, wherein the vehicle is a hybrid vehicle including a battery and a motor, and wherein each of the battery, motor, and engine are coupled to a vehicle drivetrain for providing power to vehicle wheels.

3. The method of claim 2, wherein initially pulling up the engine in response to operator torque demand includes, in response to operator torque demand being higher than an amount that can be met by the battery and/or the motor, spinning up the engine to the higher power to meet the operator torque demand, and wherein holding the engine at the higher power includes maintaining the engine at the higher power for a first, longer duration irrespective of changes in operator torque demand to catalyst heating.

4. The method of claim 3, wherein the subsequently pulling up in response to catalyst temperature includes subsequently pulling up the engine in response to catalyst temperature being lower than a threshold, the threshold based at least on a battery state of charge, and holding the engine at the lower power for a second, shorter duration to heat the catalyst.

5. The method of claim 4, wherein the threshold is further based on a vehicle speed and driver demand.

6. The method of claim 4, wherein the subsequently pulling includes, when the battery state of charge is higher than a threshold charge, pulling up the engine in response to catalyst temperature being lower than a first threshold, and when the battery state of charge is lower than the threshold charge, pulling up the engine in response to catalyst temperature being lower than a second threshold, the first threshold lower than the second threshold.

7. The method of claim 2, wherein while holding the engine at the higher power and while holding the engine at the lower power, transient torque demands are met by the motor and/or the battery.

8. The method of claim 1, further comprising, while initially pulling up the engine, indicating a first engine cold-start on a counter, and incrementing the counter while subsequently pulling up the engine, the counter reset in response to an operator vehicle key-off event.

9. The method of claim 1, wherein a single vehicle drive cycle includes vehicle operation from an operator vehicle key-on event to a subsequent operator vehicle key-off event.

10. A method for a hybrid vehicle, comprising:
during a first cold-start of a single drive cycle, operating a turbocharged direct-injection engine at a first, higher power for a first, longer duration responsive to driver demand; and
during each subsequent cold-start of the drive cycle, operating the engine at a second, lower power for a second, shorter duration responsive to catalyst temperature.

11. The method of claim 10, wherein during the first cold-start, the engine is operated in response to driver demand being higher than a threshold demand, and wherein during each subsequent cold-start, the engine is operated in response to engine exhaust catalyst temperature being lower than a threshold temperature.

12. The method of claim 11, wherein during the first cold-start, the threshold demand is based on battery state of charge, and wherein during each subsequent cold-start, the threshold temperature is based on the battery state of charge.

13. The method of claim 12, wherein during the first cold-start, the threshold demand is lowered as the battery state of charge falls, and wherein during each subsequent cold-start, the threshold temperature is raised as the battery state of charge falls.

14. The method of claim 10, wherein during the first cold-start, ignition spark timing is retarded by a smaller amount and wherein during each subsequent cold-start, ignition spark timing is retarded by a larger amount.

15. The method of claim 10, further comprising, initiating counting on a cold-start counter in response to the first cold-start of the single drive cycle, and incrementally counting on the cold-start counter is response to each subsequent cold-start of the drive cycle, the counter reset in response to completion of the single drive cycle.

16. The method of claim 10, wherein the single drive cycle includes vehicle operation from a first operator vehicle key-on event to a second, subsequent operator vehicle key-on event.

17. The method of claim 10, wherein operating the engine at lower power includes operating the engine to extend an engine-off period between subsequent cold-starts of the single drive cycle.

18. A hybrid vehicle system, comprising:
an engine including an exhaust catalyst;
a temperature sensor coupled to the exhaust catalyst for indicating a catalyst temperature;
a battery;
a motor;
a driveline coupling vehicle wheels to an output of each of the engine, battery and motor; and
a controller with computer readable instructions for,
during a drive cycle, monitoring the catalyst temperature while operating the vehicle system in an engine-off mode;
in response to operator torque demand being higher than a threshold demand, operating the engine in a first cold-start mode with the engine pulled-up at a first faster rate to a first, higher power to meet the torque demand, the engine then maintained at the first power for a first, longer duration to heat the exhaust catalyst; and
during the same drive cycle, in response to catalyst temperature falling below a threshold temperature, operating the engine in a second cold-start mode with the engine pulled-up at a second slower rate to a second, lower power for a second, shorter duration to heat the exhaust catalyst.

19. The vehicle system of claim 18, further comprising a cold-start counter, wherein the controller includes further instructions for starting the counter when operating in the first cold-start mode, and incrementing the counter when operating in the second cold-start mode.

* * * * *